United States Patent [19]
Savelli

[11] Patent Number: 6,151,230
[45] Date of Patent: Nov. 21, 2000

[54] CHARGE PUMP REGULATION CIRCUIT WITH OVERVOLTAGE PROTECTION

[75] Inventor: Laurent Savelli, Meylan, France

[73] Assignee: STMicroelectronics S.A., Gentilly, France

[21] Appl. No.: 09/398,832

[22] Filed: Sep. 16, 1999

[30]     Foreign Application Priority Data

Sep. 18, 1998  [FR]  France .................................. 98 11822

[51] Int. Cl.⁷ .............................. H02M 7/00; H02M 3/18
[52] U.S. Cl. ................................................ 363/60; 363/59
[58] Field of Search ....................................... 363/59, 60

[56]             References Cited

U.S. PATENT DOCUMENTS

| | | | |
|---|---|---|---|
| Re. 35,121 | 12/1995 | Olivo et al. ................................ | 363/60 |
| 4,794,278 | 12/1988 | Vajdic ..................................... | 307/297 |
| 4,933,827 | 6/1990 | Olivo et al. ............................... | 363/60 |
| 5,202,587 | 4/1993 | McLaury .............................. | 307/296.2 |
| 5,436,821 | 7/1995 | Inoue ..................................... | 363/60 |
| 5,499,183 | 3/1996 | Kobatake ................................. | 363/59 |
| 5,539,351 | 7/1996 | Gilsdorf et al. ........................ | 327/379 |
| 5,563,779 | 10/1996 | Cave et al. ................................ | 363/59 |
| 5,566,059 | 10/1996 | Tan .......................................... | 363/60 |
| 5,677,643 | 10/1997 | Tomita ..................................... | 327/78 |
| 5,818,290 | 10/1998 | Tsukada ................................... | 327/537 |

OTHER PUBLICATIONS

French Search Report from Application No. 9811822, filed Sep. 18, 1998.
Patent Abstracts of Japan, vol. 0, No. 0 & JP 08 221980 A, May 4, 94(Nec Corporation).

*Primary Examiner*—Peter S. Wong
*Assistant Examiner*—Bao Q. Vu
*Attorney, Agent, or Firm*—Wolf, Greenfield & Sacks, P.C.; James H. Morris; Theodore E. Galanthay

[57]             ABSTRACT

A system of regulation of a charge pump for providing an overvoltage greater by a predetermined amount than a supply voltage, including a constant current source connected between the supply voltage and a control terminal, an N-channel MOS transistor connected between the control terminal and the ground, the gate of which is connected to receive the overvoltage, the transistor being of such dimensions that it conducts all the current provided by the constant current source when the overvoltage is greater than a maximum allowable voltage, and circuitry for limiting the overvoltage when the voltage of the control terminal is close to the ground potential.

5 Claims, 4 Drawing Sheets

CHARGE PUMP REGULATION CIRCUIT WITH OVERVOLTAGE PROTECTION

BACKGROUND OF THE INVENTION

1. Field of the Invention

The present invention relates to voltage step-up charge pumps and more specifically to a regulation system of such a charge pump.

2. Discussion of the Related Art

A charge pump is often used to provide a voltage raised with respect to the supply voltage. Such an overvoltage is for example used to turn on an N-channel MOS transistor, the drain of which is connected to the supply voltage, this, to obtain on the transistor source a voltage equal to the supply voltage. Such a transistor is often used in a DRAM to charge the memory cells to the supply voltage.

FIG. 1 shows a charge pump 10 coupled with a conventional regulation system 20. Charge pump 10 generates an overvoltage VPP.

Regulation system 20 includes a circuit 30 generating a reference voltage Vref on a terminal 31, and a measurement circuit 40 generating a measurement voltage Vmes on a terminal 41. It further includes a comparator 50, the inputs of which are connected to terminals 31 and 41 and which generates on a terminal 51 a charge pump enable signal.

Reference circuit 30 includes an N-channel MOS transistor 32, diode-connected between a supply voltage terminal Vdd and terminal 31 and a plurality 33 of N-channel MOS transistors, series-connected between terminal 31 and the ground, all controlled by a same bias voltage BIASN. Transistors 33 form a resistor of relatively high value. It should be noted that the voltage of terminal 31 does not vary as long as Vdd does not vary, and is used as a reference voltage Vref.

Measurement circuit 40 includes a first N-channel MOS transistor 42, diode-connected between terminal 41 and the supply voltage terminal via a second N-channel MOS transistor 43. The gate of transistor 43 receives overvoltage VPP generated by charge pump 10. Measurement circuit 40 further includes a plurality 44 of N-channel MOS transistors, series-connected between terminal 41 and the ground, controlled by bias voltage BIASN.

With this configuration, voltage VPP is regulated to Vdd+Vt, where Vt is the threshold voltage of transistor 43. Indeed, the source voltage of transistor 43 settles at VPP−Vt. If voltage VPP−Vt is smaller than Vdd, voltage Vmes is smaller than voltage Vref, whereby comparator 50 activates charge pump 10 to increase voltage VPP. Voltage VPP increases until voltage VPP−Vt on the source of transistor 43 is equal to Vdd, in which case voltage Vmes is equal to Vref and comparator 50 deactivates charge pump 10.

Clearly, transistor 43 and transistors of charge pump 10 are submitted to a voltage VPP greater than supply voltage Vdd. Supply voltage Vdd is allowed to vary within a given range under the voltage allowed by the technology used, with overvoltage VPP of course having to be smaller than this allowable voltage. Now, with recent technologies, the overvoltage VPP that would be obtained if the supply voltage were equal to its upper limit is so close to the allowable voltage that the transistors submitted to voltage VPP would end up being damaged in time.

SUMMARY OF THE INVENTION

An object of the present invention is to provide a simple and inexpensive charge pump regulation system, to deactivate the charge pump when the supply voltage exceeds a predetermined threshold.

To achieve this and other objects, the present invention provides a system for regulating a charge pump for providing an overvoltage greater by a predetermined amount than a supply voltage, including a constant current source connected between the supply voltage and a control terminal, an N-channel MOS transistor connected between the control terminal and the ground, the gate of which is connected to receive the overvoltage, the transistor being of such dimensions that it conducts all the current provided by the constant current source when the overvoltage is greater than a maximum allowable voltage, and means for limiting the overvoltage when the voltage of the control terminal is close to the ground potential.

According to an embodiment of the present invention, the current source is a first P-channel MOS transistor, the gate of which receives a reference voltage independent from the supply voltage.

According to an embodiment of the present invention, the charge pump circuit includes a comparator which generates a deactivation order for the charge pump when the overvoltage reaches a desired value, the means for limiting the overvoltage acting upon the deactivation order.

According to an embodiment of the present invention, the charge pump circuit includes a comparator which generates a deactivation order for the charge pump when the overvoltage reaches a desired value, the means for limiting the overvoltage including a second P-channel MOS transistor connected to lower the desired value.

According to an embodiment of the present invention, the desired value is obtained by means of a resistive bridge, the transistor short-circuiting the resistive bridge.

The foregoing objects, features and advantages of the present invention will be discussed in detail in the following non-limiting description of specific embodiments in connection with the accompanying drawings.

DETAILED DESCRIPTION

It is desired, according to the present invention, to find a means independent from supply voltage Vdd to limit the overvoltage VPP provided by a charge pump. An immediate solution would be to provide an additional comparator to deactivate the charge pump when overvoltage VPP exceeds a reference voltage independent from the supply voltage. However, such a solution requires using an additional comparator, which results in a significant additional cost for the device.

Figure 1:
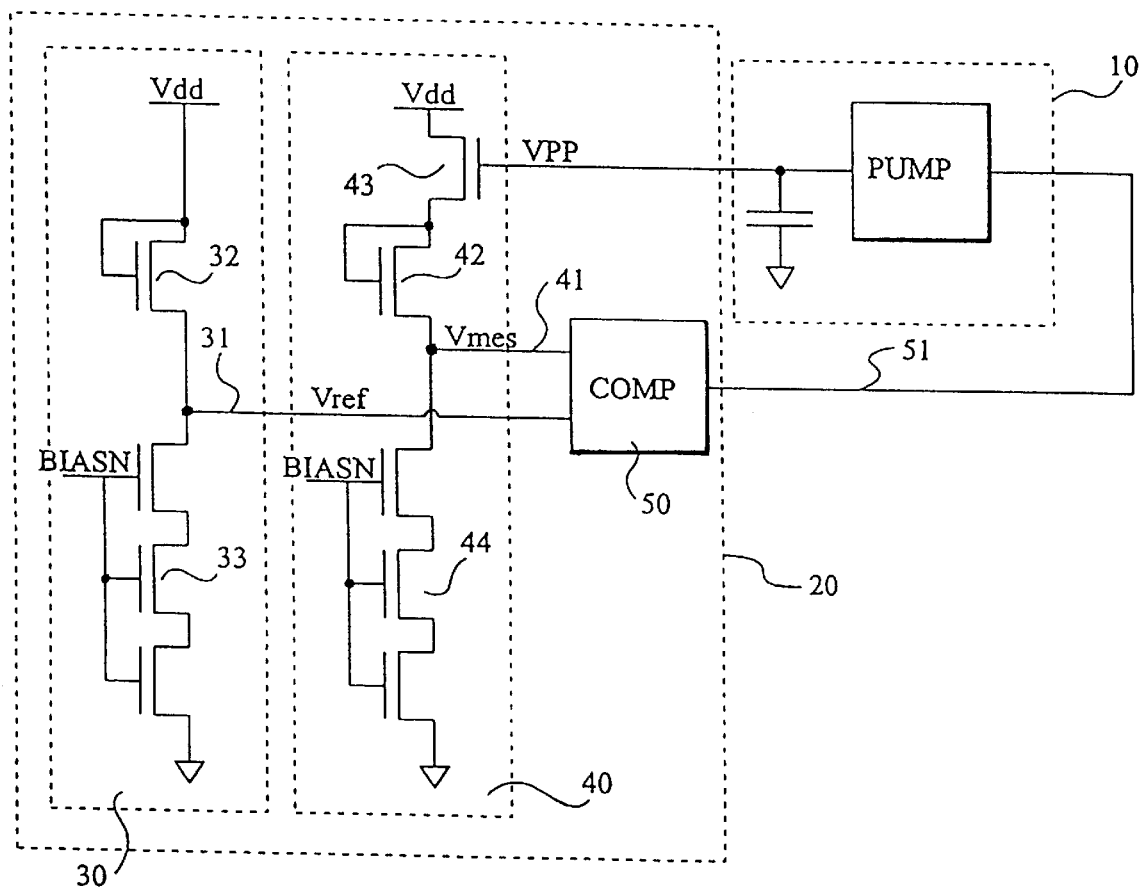
FIG. 1, previously described, shows a charge pump regulation system according to prior art.
Figure 2:
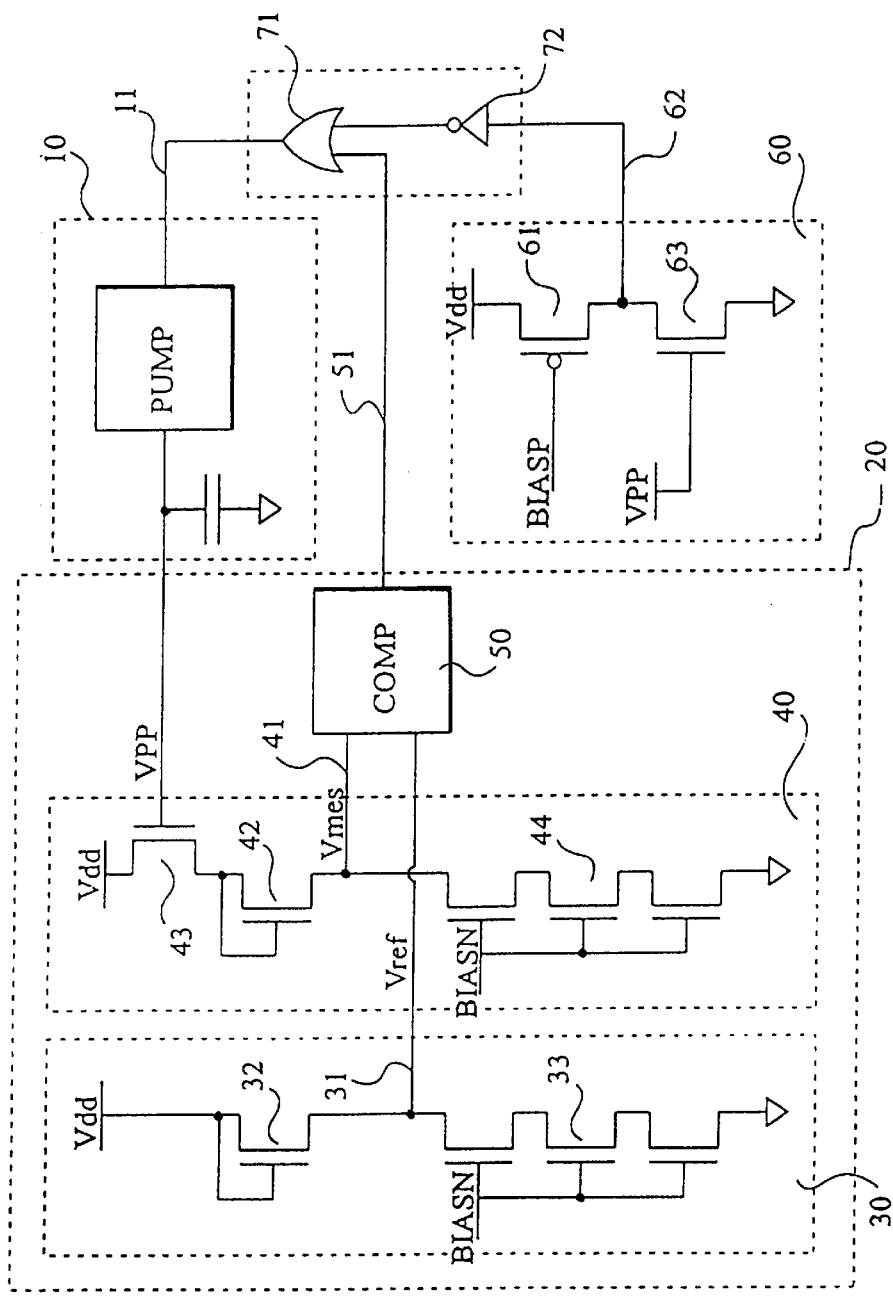
FIG. 2 shows an embodiment of a charge pump regulation system according to the present invention.

FIG. 2 shows charge pump 10 and regulation circuit 20 of FIG. 1. According to the present invention, a supply voltage control circuit 60 includes a P-channel MOS transistor 61 connected between the supply voltage terminal and a terminal 62, and an N-channel MOS transistor 63 connected between terminal 62 and the ground. The gate of transistor 61 receives a bias voltage BIASP independent from supply voltage Vdd. Transistor 61, so biased, behaves as a constant current source. Bias voltage BIASP is obtained conventionally, for example, by means of a band-gap generator or from a bipolar transistor base-emitter voltage.

The gate of transistor 63 is connected to receive voltage VPP. The dimensions of transistor 63 are chosen so that the latter absorbs any current generated by transistor 61 when voltage VPP exceeds a predetermined threshold $V_{max}$ corresponding to the maximum allowable voltage.

Thus, when voltage VPP is smaller than threshold $V_{max}$, terminal 62 is brought to a potential close to supply voltage Vdd and when voltage VPP is close to threshold $V_{max}$, terminal 62 is brought to a potential close to the ground. The signal generated at the level of terminal 62 is used to activate or deactivate charge pump 10.

According to the embodiment of FIG. 2, terminal 62 is connected by an inverter 72 to a first input of an OR gate 71, the second input of which is connected to output 51 of comparator 50. The output of OR gate 71 is connected to the activation input of charge pump circuit 10. Thus, when voltage VPP exceeds the predetermined threshold, input 11 of the charge pump is brought to a high voltage, or logic 1, and charge pump 10 is deactivated.

Figure 3:
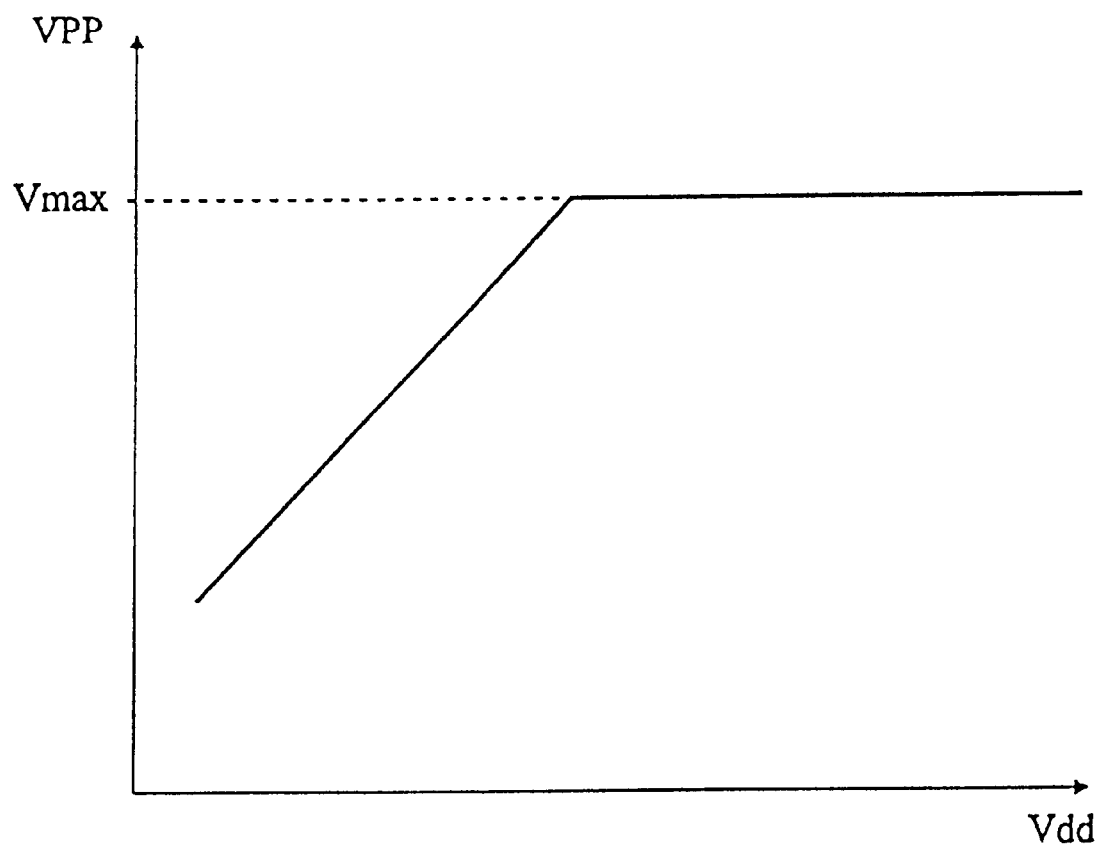
FIG. 3 shows the voltage generated by the charge pump against the supply voltage in the circuit of FIG. 2.

FIG. 3 shows voltage VPP against supply voltage Vdd in the circuit of FIG. 2. If voltage VPP exceeds predetermined threshold $V_{max}$, the charge pump is deactivated and voltage VPP stops increasing. If voltage VPP tends to decrease, it falls under threshold $V_{max}$, which reactivates the charge pump to have voltage VPP increase again. A regulation effect of voltage VPP at value $V_{max}$ is obtained.

Figure 4:
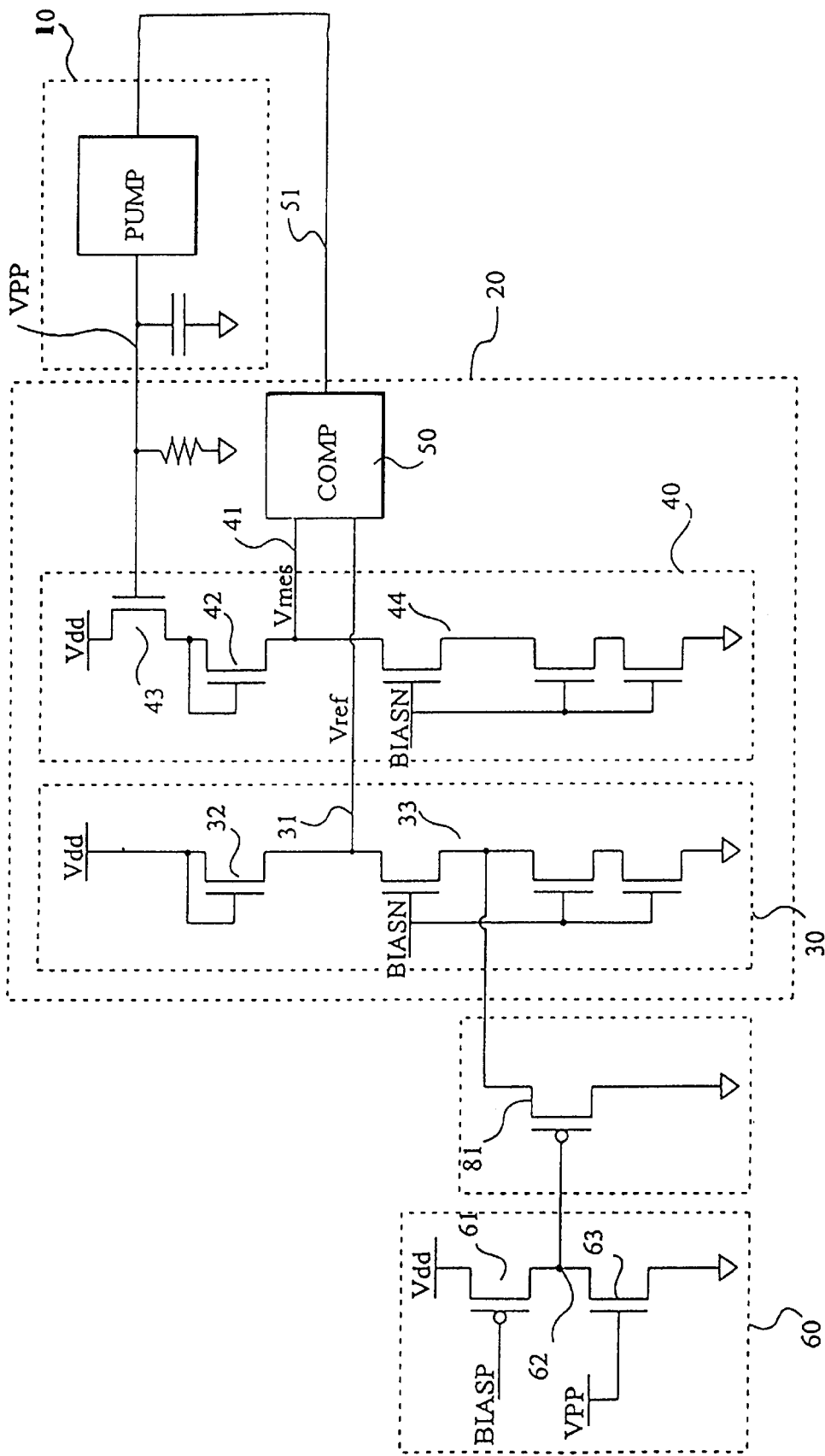
FIG. 4 shows an alternative of the regulation system of FIG. 2.

FIG. 4 shows an alternative of the circuit of FIG. 2. Control circuit 60 here controls a P-channel MOS transistor 81. This transistor is connected to ground one of the interconnection nodes of transistors 33 of reference circuit 30.

When voltage VPP exceeds threshold $V_{max}$, terminal 62 switches to the low state. Transistor 81 is then turned on and several transistors 33 are short-circuited. Voltage Vref lowers. Accordingly, comparator 50 deactivates charge pump circuit 10 until the voltage of terminal 41 decreases to the new voltage Vref. As a result, the overvoltage VPP generated by the charge pump corresponding lowers. Transistor 81 then conducts less, which raises voltage Vref. Voltage VPP thus is regulated at $V_{max}$.

Of course, the present invention is likely to have various alterations, modifications, and improvements which will readily occur to those skilled in the art. For example, transistors 33 may be replaced with a resistive bridge or any other device having the same behavior.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A system for regulating a charge pump that provides an overvoltage greater, by a predetermined amount, than a supply voltage, including:

a constant current source connected between the supply voltage and a control terminal;

an N-channel MOS transistor having a gate that is connected to receive the overvoltage, a source that is connected to ground, and a drain that is connected to the control terminal, the transistor being dimensioned to conduct all the current provided by the constant current source when the overvoltage is greater than a maximum admissible voltage; and means for limiting the overvoltage when a voltage of the control terminal is close to a ground potential.

2. The charge pump regulation system of claim 1, wherein the current source is a first P-channel MOS transistor, the gate of which receives a reference voltage independent from the supply voltage.

3. The charge pump regulation system of claim 1, in which the charge pump circuit includes a comparator which generates a deactivation order for the charge pump when the overvoltage reaches a desired value, wherein the means for limiting the overvoltage act upon the deactivation order.

4. The charge pump regulation system of claim 1, wherein the charge pump circuit includes a comparator which generates a deactivation order for the charge pump when the overvoltage reaches a desired value, wherein the means for limiting the overvoltage include a second P-channel MOS transistor connected to lower the desired value.

5. The charge pump regulation system of claim 4, wherein the desired value is obtained by means of a resistive bridge, and wherein the second P-channel MOS transistor short-circuits the resistive bridge.

* * * * *